(12) United States Patent
Yamanaka

(10) Patent No.: US 7,856,126 B2
(45) Date of Patent: Dec. 21, 2010

(54) POSITION SENSING DEVICE

(75) Inventor: Tomoaki Yamanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 869 days.

(21) Appl. No.: 11/155,869

(22) Filed: Jun. 16, 2005

(65) Prior Publication Data

US 2006/0007316 A1 Jan. 12, 2006

(30) Foreign Application Priority Data

Jun. 28, 2004 (JP) ............................. 2004-189814

(51) Int. Cl.
 G06K 9/00 (2006.01)
 H04N 5/225 (2006.01)
 H04N 9/04 (2006.01)
 H04N 5/228 (2006.01)
 H04N 5/262 (2006.01)
(52) U.S. Cl. .................. 382/123; 382/106; 348/207.99; 348/208.6; 348/208.7; 348/208.11; 348/240.99; 348/240.1; 348/240.2; 348/240.3
(58) Field of Classification Search ............. 348/207.99
See application file for complete search history.

(56) References Cited

U.S. PATENT DOCUMENTS

| 3,761,182 A | * | 9/1973 | Kubisiak et al. ............. 356/639 |
| 3,772,457 A | * | 11/1973 | Macovski .................... 348/163 |
| 5,001,338 A | * | 3/1991 | Boero ................... 250/227.21 |
| 5,327,408 A | * | 7/1994 | Belser ...................... 369/44.26 |
| 5,396,434 A | * | 3/1995 | Oyama et al. ................ 700/193 |
| 5,534,692 A | | 7/1996 | Nakayama |
| 5,880,880 A | * | 3/1999 | Anderson et al. ........... 359/385 |
| 5,955,728 A | | 9/1999 | Nakayama |
| 6,049,075 A | | 4/2000 | Nakayama |
| 6,049,087 A | | 4/2000 | Nakayama |
| 6,954,589 B2 | | 10/2005 | Okawara |
| 2001/0007472 A1 | * | 7/2001 | Nishimura ................... 348/335 |
| 2002/0166885 A1 | * | 11/2002 | Sugawara .................... 228/103 |
| 2003/0060129 A1 | * | 3/2003 | Berne et al. .................... 451/10 |
| 2004/0037547 A1 | * | 2/2004 | Okawara ................... 396/133 |
| 2004/0125711 A1 | * | 7/2004 | Sato et al. ................. 369/44.32 |
| 2004/0183036 A1 | * | 9/2004 | Nishimura ............. 250/492.22 |

FOREIGN PATENT DOCUMENTS

| JP | 4-254709 A | | 9/1992 |
| JP | 6-102936 A | | 4/1994 |
| JP | 08054553 A | * | 2/1996 |
| JP | 10-047999 A | | 2/1998 |
| JP | 2000-356504 A | | 12/2000 |
| JP | 2004-085684 A | | 3/2004 |

* cited by examiner

*Primary Examiner*—Vikkram Bali
*Assistant Examiner*—Michelle Entezari
(74) *Attorney, Agent, or Firm*—Canon USA Inc IP Division

(57) ABSTRACT

A position sensing device is provided which can include a first sensing unit for outputting a detection signal periodically changing in accordance with the movement of an object, a second sensing unit for sensing a reference position of the object, and an arithmetic unit for determining position data corresponding to the position of the object based on the detection signals, where the position sensing device can determine the relative position of a lens unit.

2 Claims, 10 Drawing Sheets

POSITION SENSING DEVICE

BACKGROUND OF THE INVENTION

1. Field of the Invention

The present invention generally relates to a position sensing device for sensing the position of an object.

2. Description of the Related Art

In conventional methods, when, for example, moving an optical lens in the optical axis direction, the amount of movement of the optical lens is measured by a position sensing device, such as a linear scale, to detect the position of the optical lens. Such a position sensing device includes a scale section (or a sensor section) secured to an object, such as an optical lens, and a sensor section (or a scale section) secured to a portion, such as a lens barrel. By detecting the relative movement of the scale section and the sensor section, the position sensing device acquires positional data.

To acquire the positional data, the position sensing device cuts out parts of a plurality of periodically changing signals having different phases and carries out an interpolation arithmetic operation on the cutout signals (for example, Japanese Patent Laid-Open No. 2000-356504, in particular, paragraphs 0022 to 0025 and FIGS. 5 and 6). This position sensing method provides relatively decent precision position sensing, and therefore, this method is used for measuring the amount of lens movement in optical apparatuses.

In such a conventional position sensing method, a position (hereinafter referred to as a "reference position") used for calculating a relative measured position, is required. More specifically, a moving unit having a built-in optical lens having a light-shielding unit, and a reset sensor (e.g., a photo interrupter) is mounted on a portion (e.g., a lens barrel). In such a structure, the light-shielding unit blocks the optical path of the photo interrupter in accordance with the movement of the moving unit so that the output of the sensor changes from high to low or from low to high. Accordingly, a position detected at the change in the output of the sensor is defined as the reference position.

Some conventional position sensing devices cause the moving unit to be brought into contact with a mechanical stopper to define the contact position as a reference position (for example, Japanese Patent Laid-Open No. 6-102936, in particular, paragraphs 0031 to 0033 and FIG. 1).

In order to determine the relative position of an object, the reference position needs to be more accurately detected.

In general, by monitoring the output of the reset sensor, position data corresponding to the point, at which the output of the reset sensor changes, is defined as data representing a measured reference position.

However, since the position data is generated using a different system than the reset sensor (e.g., based on a plurality of periodically changing multi-phase signals), the position data may be shifted from data representing the actual reference position. In this case, an error occurs in the relative position (e.g., the lens position determined minus reference position) determined based on the measured reference position.

Even when a position, where a moving unit is brought into contact with a mechanical stopper, is defined as a reference position, as described in Japanese Patent Laid-Open No. 6-102936, position data generated based on the output of the sensor unit may be shifted from data representing the reference position.

SUMMARY OF THE INVENTION

At least one exemplary embodiment provides a position sensing device including a first sensing unit configured to output a plurality of detection signals periodically changing in accordance with the movement of an object, a second sensing unit configured to sense a reference position of the object, an arithmetic unit configured to determine position data of the object, and an adjustment unit configured to adjust at least one of the positions of the first sensing unit and the second sensing unit so that the position data at sensing time of the second sensing unit matches data representing the reference position. In at least one exemplary embodiment, since the position data at sensing time of the second sensing unit represents the reference position, the sensing accuracy of the reference position can be increased.

Further areas of applicability of exemplary embodiments will become apparent from the detailed description provided hereinafter. It should be understood that the detailed description and specific examples, while indicating a few of the possible exemplary embodiments, are intended for purposes of illustration only and are not intended to limit the scope of exemplary embodiments.

BRIEF DESCRIPTION OF THE DRAWINGS

Exemplary embodiments will become apparent from the following detailed description, taken in conjunction with the drawings.

DESCRIPTION OF THE EMBODIMENTS

The following description of at least one of the possible exemplary embodiment(s) is merely illustrative in nature and is in no way intended to limit the invention, its application, its equivalents, or uses.

Processes, techniques, apparatus, and materials as known by one of ordinary skill in the art may not be discussed in detail but are intended to be part of the enabling description where appropriate. For example some examples of position sensors are discussed, equivalents and other position sensors as known by one of ordinary skill in the relevant arts are intended to be included in the scope of at least a few exemplary embodiments.

Additionally the actual size of optical elements may not be discussed however any size from macro to micro and nano optical elements are intended to lie within the scope of exemplary embodiments (e.g., optical elements with characteristic sizes of nanometer size, micro size, centimeter, and meter sizes).

Additionally exemplary embodiments are not limited to visual optical systems, for example the system can be designed for use with infrared and other wavelengths systems. For example a light detector (e.g., a detector measuring infrared markings).

Exemplary embodiments are described below with reference to the accompanying drawings.

First Embodiment

Figure 1:
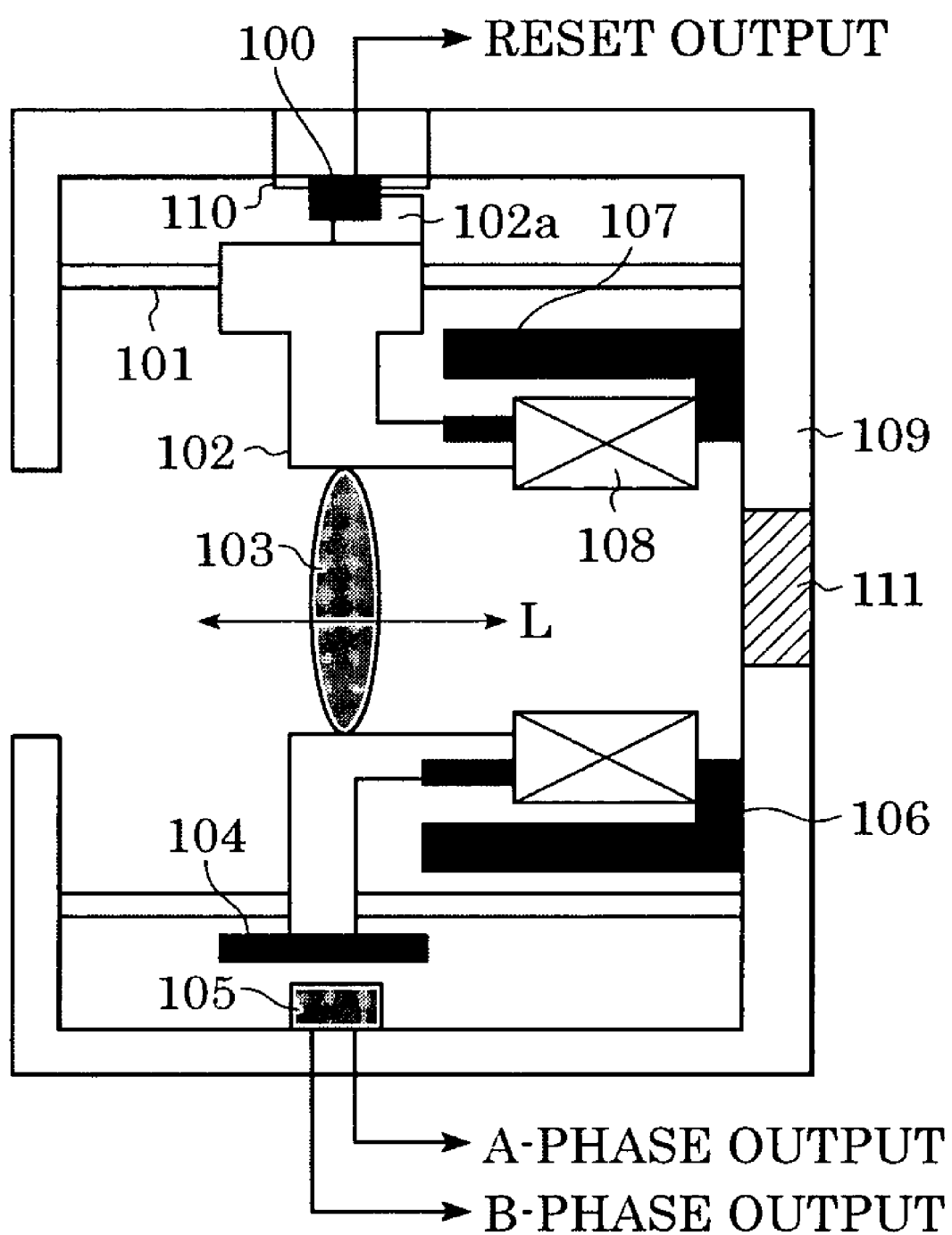
FIG. 1 illustrates a sectional view of a lens unit including a position sensing device according to a first embodiment of at least one exemplary embodiment.

FIG. 1 illustrates a sectional view of a lens unit (optical apparatus) including a linear actuator according to a first embodiment of at least one exemplary embodiment.

Figure 5:
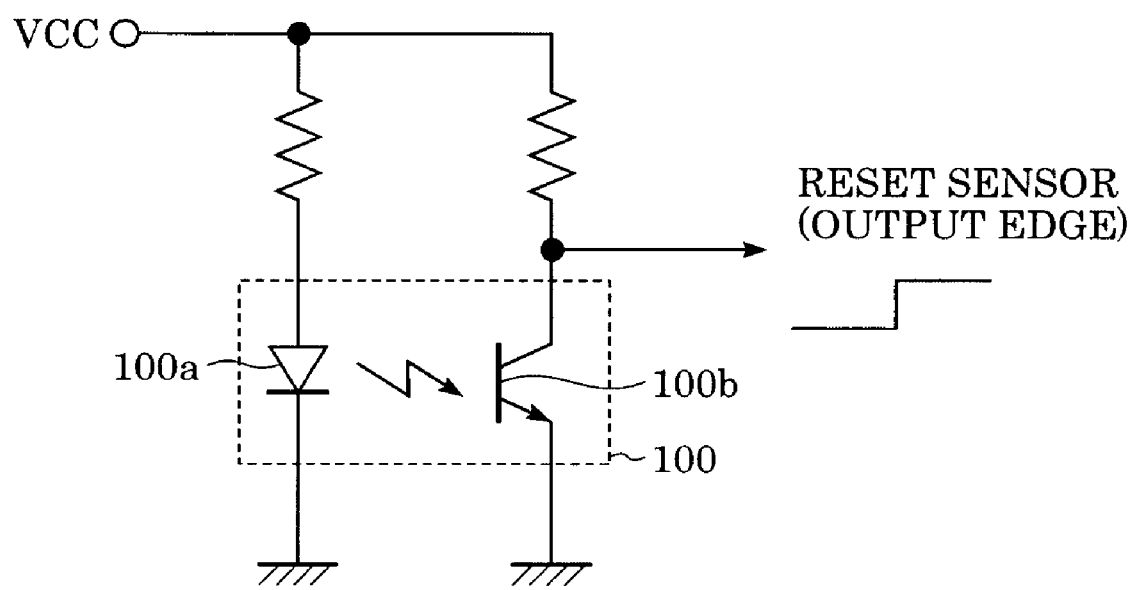
FIG. 5 illustrates a circuit diagram of a reset sensor.

A reset sensor (second sensing unit) 100 is operatively connected to a lens barrel 109. As illustrated in FIG. 5, the reset sensor 100 can include a photo interrupter, which can include a light emitting device 100a and a light receiving device 100b. A light shielding unit 102a (FIG. 1) is formed on a lens holder 102, which holds a lens (focusing lens) 103. The light shielding unit 102a can pass through the inside of the reset sensor 100 (between the light emitting device 100a and the light receiving device 100b) in accordance with the movement of the lens holder 102.

A sliding mechanism (adjustment unit) 110 slides the reset sensor 100 in the moving direction of the lens 103 (i.e., the direction of an optical axis L). The function of this sliding mechanism is described later.

Although the lens unit includes one lens 103 in FIG. 1, this is only one example of many possible exemplary embodiments, and thus the lens unit may include another lens (for example, a variable magnifying lens) in addition to the lens 103. Additionally, in yet at least one further exemplary embodiment an imaging device 111, (e.g., a CCD (Charge-Coupled Device) and CMOS (Complementary Metal-Oxide Semiconductor) sensor, equivalents and other imaging sensors as known by one of ordinary skill in the relevant arts), can be operatively connected to the lens barrel 109 to photoelectrically convert a subject image (optical image) formed by the lens in the lens unit.

The light shielding unit 102a blocks and unblocks light emitted from the light emitting device 100a to the light receiving device 100b. Accordingly, the output of the reset sensor 100 can change (i.e., from HI (high) to LOW (low) and from LOW to HI).

The lens unit can detect position information when the output of the reset sensor 100 changes. This information can represent a reference position, which can be used to determine a relative position.

In this embodiment, an optical position sensor can be used to sense the position of the lens holder 102 (i.e., the lens 103). More specifically, in the non-limiting example illustrated in FIG. 1, the position of the lens 103 can be sensed by using an optical scale 104 secured to the lens holder 102 and a position sensor (first sensing unit) 105 including a light emitting device and a light receiving device.

The position sensor 105 can output an A-phase sine wave signal which varies as a sine wave and a B-phase signal whose phase is 90° shifted from the A phase (i.e., a cosine wave signal) in accordance with a positional change relative to the optical scale 104.

The lens holder 102 can be engaged with a bar 101 extending in the optical axis direction so that the lens holder 102 can move in the optical axis direction. The lens holder 102 can be driven by a motor (e.g., a voice coil motor). As shown in FIG. 1, if using a voice coil motor, the voice coil motor can include a yoke 106, a magnet 107, and a coil 108. By powering on the coil 108, the lens holder 102 can be moved in the optical axis direction.

Figure 6A:
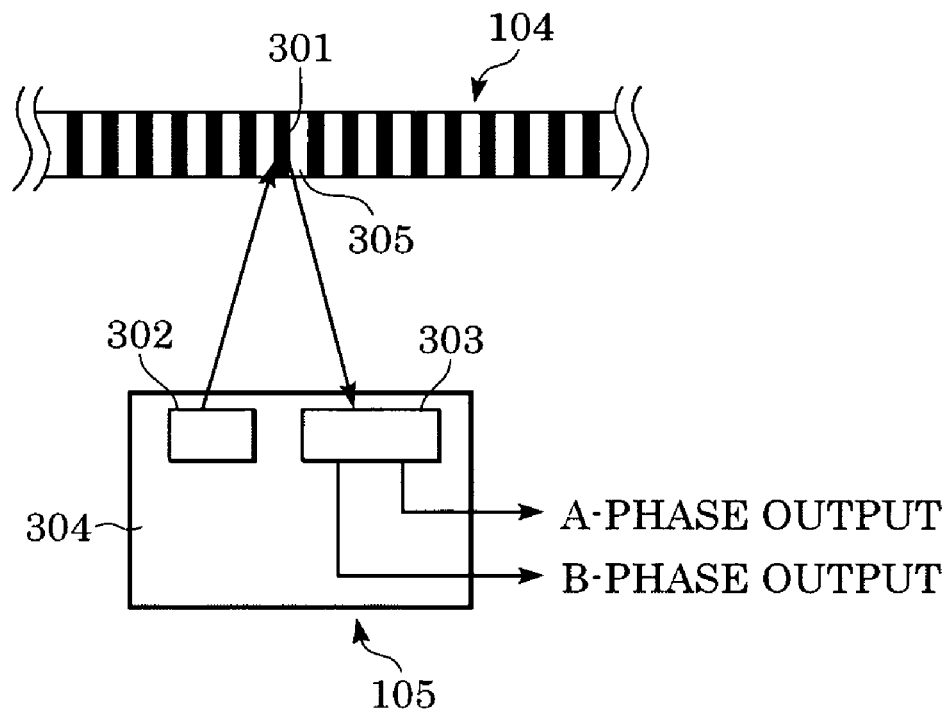
FIG. 6A illustrates the structure of an optical position sensor.

FIG. 6A illustrates the structure of a position sensor (optical position sensor) for acquiring information on a lens position, which is an example of one of many that could be used in exemplary embodiments.

As shown in FIG. 6A, on a surface of the optical scale 104, first surfaces that reflect light (hatching areas in the drawing) and second surfaces that transmit light or reflect light diffusely are alternately arranged with a predetermined pitch.

The position sensor 105 can include a light emitting unit 302 and a light receiving unit 303. The position sensor 105 can be disposed with a predetermined spacing from the optical scale 104 while facing the optical scale 104.

Light emitted from the light emitting unit 302 to the first surface of the optical scale 104 is reflected by the first surface 301. The light is then received by the light receiving unit 303 and is sensed. On the other hand, light emitted from the light emitting unit 302 to the second surface of the optical scale 104 is transmitted or diffusely reflected by the second surface 305. Therefore, the light does not reach the light receiving unit 303.

Thus, when the optical scale 104 is secured to the lens holder 102, and moves along with the lens holder 102 in the optical axis L direction, the position sensor 105 can sense periodically changing intensity of light via the light receiving unit 303. The position sensor 105 converts this light to A-phase and B-phase electrical signals (analog signals) and can output the associated electrical signals.

In this embodiment, the optical scale 104 is operatively connected to the lens holder 102 and the position sensor 105 is operatively connected to the lens barrel 109. However, in at least one exemplary embodiment, the connections are reverse so that the optical scale 104 is operatively connected to the lens barrel 109 while the position sensor 105 is operatively connected to the lens holder 102.

Figure 6B:
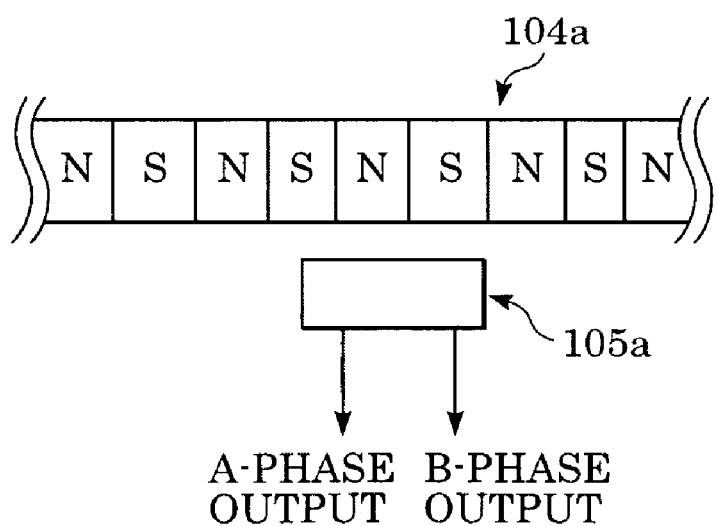
FIG. 6B illustrates the structure of a position sensor using a magnetoresistive device, both examples of position sensors, two amongst many possible, that can be used with at least a few exemplary embodiments.

There are many variations of position sensors that can be used in exemplary embodiments. FIG. 6B illustrates an example of another position sensor. Note that exemplary embodiments are not restricted to the position sensors discussed herein. Equivalent position sensors, different positioning of discussed position sensors, and position sensors as know by one of ordinary relevant skill in the arts are intended to be included within the scope of exemplary embodiments. Also, a position sensor for acquiring position information on the lens 103 may be configured as shown in FIG. 6B. That is, a detection magnet 104a has a predetermined pattern so that reverse polarities alternately appear in the moving direction of the lens 103 (in the optical axis L direction). The detection magnet 104a is mounted on the lens holder 102 and a magnetoresistive device (an MR sensor) 105a is mounted on the lens barrel 109 at a position opposed to the detection magnet 104a.

Like the structure shown in FIG. 6A, when the lens holder 102 moves in the optical axis L direction, A-phase and B-phase electrical signals (analog signals) can be output from the MR sensor 105*a*. Alternatively, the detection magnet 104*a* may be operatively connected to the lens barrel 109 while the MR sensor 105*a* may be operatively connected to the lens holder 102.

The reset operation for detecting a reference position is described next with reference to a flow chart in FIG. 3 using the lens unit according to this embodiment. The reset operation starts at power-on time of the lens unit and at a time when it is determined that normal position sensing is unavailable due to a position sensing error.

[Step S101]

Figure 2:
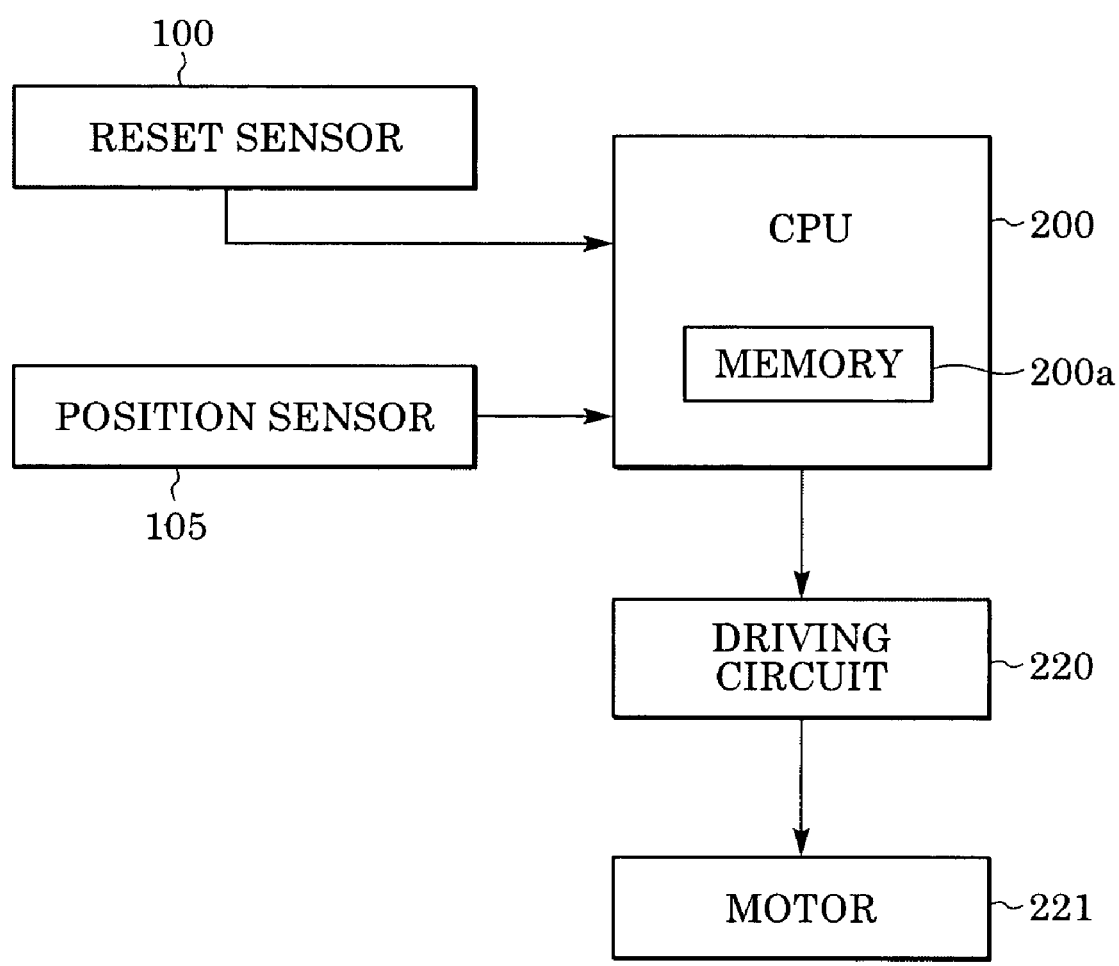
FIG. 2 illustrates a block diagram representing a part of the lens unit shown in FIG. 1.

To sense a point (edge) where the output of the reset sensor 100 changes, a central processing unit (CPU) 200 illustrated in FIG. 2 powers on the coil 108 of a voice coil motor 221 via a driving circuit 220 to move the lens 103 in the optical axis direction. For example, the CPU 200 moves the lens 103 toward a position corresponding to a mechanical end of the moving area of the lens 103 or lens barrel 109. The CPU 200 can carry out overall control of the lens unit.

[Step S102]

The CPU 200 determines whether the output of the reset sensor 100 changes while driving the lens 103. That is, to determine a position where the light shielding unit 102*a* mounted on the lens holder 102 shields the reset sensor (photo interrupter) 100 from light as a reference position, a rising edge or a falling output edge of the reset sensor 100 is detected. Hence, the detecting operation in this step can be repeated until the output edge is detected. If the output edge is detected, the process proceeds to step S103.

[Step S103]

The lens 103 can be driven to move in the reverse direction, and at least in one exemplary embodiment, at a reduced speed. That is, the lens 103 can be moved in the direction opposite to the direction in which, at step S102, the lens 103 is moved until the output edge is detected. In at least one exemplary embodiment, the moving speed is lower than that at step S102. In other exemplary embodiments, the speed can be various.

In this embodiment, during the first lens driving cycle (step S101), a reference position is coarsely determined. During the second lens driving cycle (step S103), the output edge can be detected at a reduced speed. Accordingly, the accuracy of sensing the reference position can be increased.

[Step S104]

As in step S102, the output edge of the reset sensor 100 is detected. Here, the detecting operation in this step is repeated until the output edge is detected. If the output edge is detected, the process proceeds to step S105.

[Step S105]

The CPU 200 shuts off the power to the coil 108 so as to stop driving the lens 103.

[Step S106]

When the lens 103 stops, the CPU 200 generates position data of the lens 103, which can be based on the output from the position sensor 105. This position data is data representing a reference position used for determining a relative position.

[Step S107]

The position data generated at step s106 is stored in a memory 200*a*, (e.g., a RAM (random access memory), an EEPROM (electrically erasable programmable read-only memory), equivalents, or other data storage methods and devices as known by one of ordinary skill in the relevant art) in the CPU 200. The memory 200*a* may be disposed outside the CPU 200.

Figure 4:
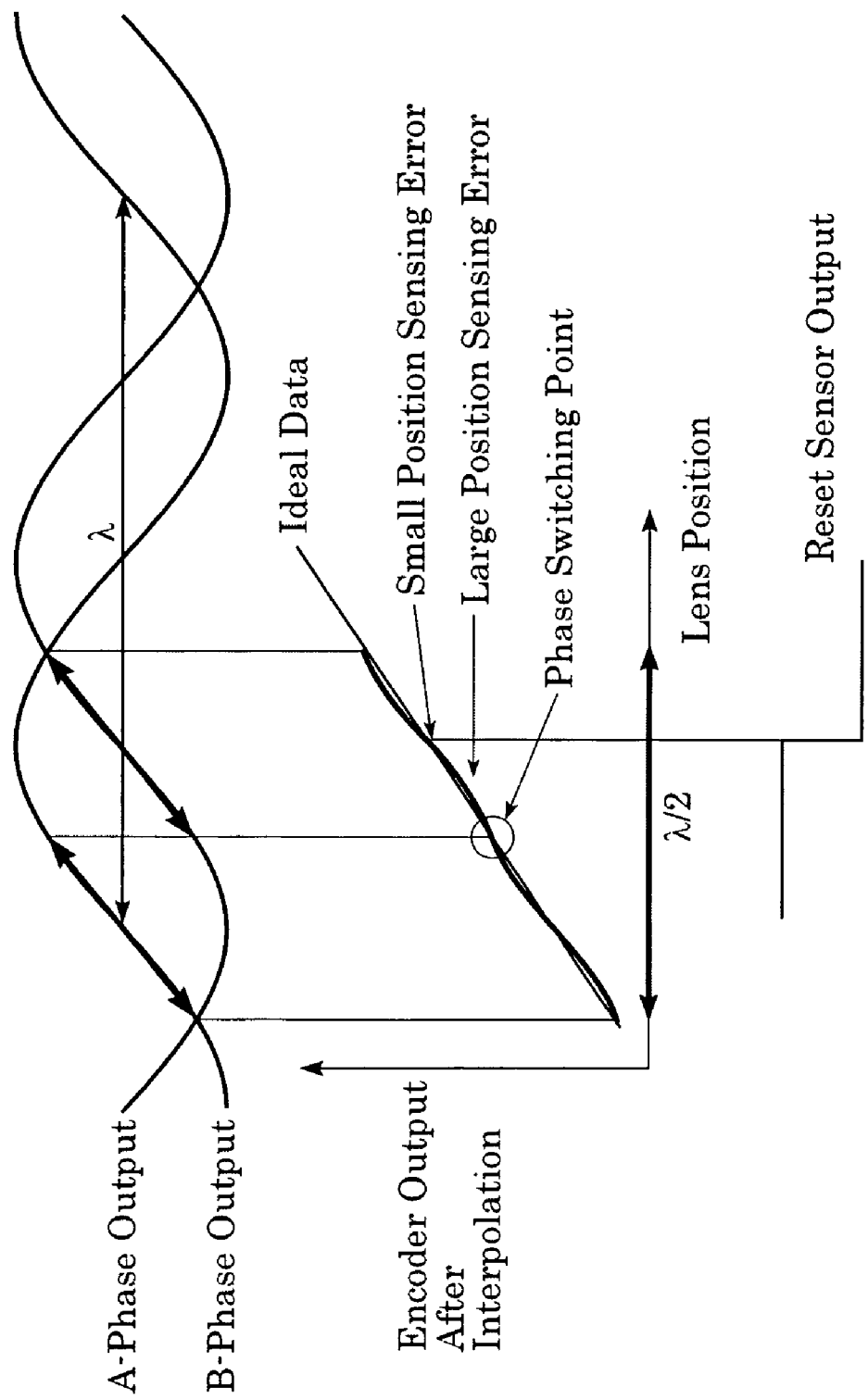
FIG. 4 illustrates the principal for sensing a position.

FIG. 4 illustrates the principal for sensing the position of a lens based on two A-phase and B-phase sine wave signals. Components to which collinear approximation can be applied are cut out from both A-phase sine wave and B-phase sine wave (within the range of λ/4). The A-phase component is connected to the B-phase component (an interpolation arithmetic operation). Since position data obtained from the interpolation arithmetic operation is proportional to the amount of movement of the lens 103, the position of the lens 103 can be obtained by reading this position data.

As shown in FIG. 4, some points of the components cut out from both A-phase sine wave and B-phase sine wave coincide with ideal data (i.e., data indicating the actual lens position), and therefore, an error (i.e., a difference between the position data obtained by the interpolation arithmetic operation and the ideal data) becomes zero. However, other points of the components cut out from both the A-phase sine wave and the B-phase sine wave do not coincide with the ideal data, and therefore, an increase in error appears roughly every λ/8. Also, a switching point between the components of the A-phase sine wave and the B-phase sine wave is not always linear due to a difference in magnitude between the A-phase output and the B-phase output and an offset.

Figure 3:
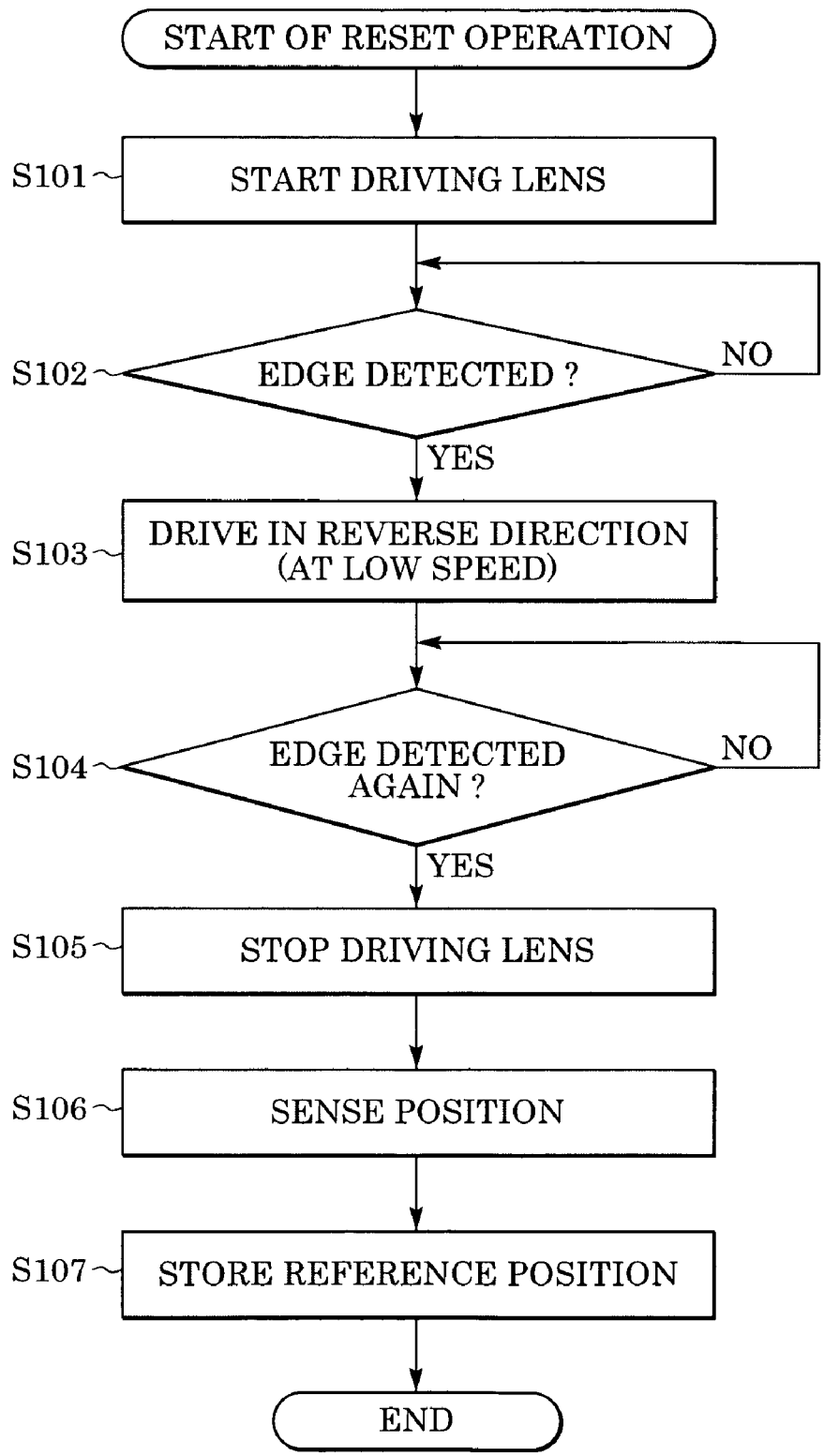
FIG. 3 illustrates a flow chart of the operation of the position sensing device according to the first embodiment.

Consequently, during the reset operation shown in FIG. 3, a point where the error of position detection becomes a minimum or a preset reduced value, that is, a point where position data obtained by the interpolation arithmetic operation substantially coincides with the ideal data or a preset reduced value, is defined as a reference position. Thus, the relative position of the lens 103 can be detected more accurately.

In this embodiment, a point where the error of position detection is reduced can be sensed as a reference position as follows. That is, an output edge from the reset sensor 100 can be sensed at a point where position data is substantially equal to the ideal data.

In a first method in accordance with at least one exemplary embodiment, a reference position is sensed by adjusting a mounting location of the reset sensor 100.

More specifically, the sliding mechanism 110 (refer to FIG. 1), which slides the reset sensor 100 in the moving direction of the lens 103 (in the optical axis L direction), is operatively connected to the lens barrel 109. The position of the reset sensor 100 is adjusted such that the output of the reset sensor 100 changes at a point where the error of position sensing becomes substantially zero, while sliding the reset sensor 100 with the sliding mechanism 110. After the position of the reset sensor 100 is adjusted, the reset sensor 100 is secured to the lens barrel 109. Consequently, the sensing accuracy of a reference position can be increased, and therefore, the sensing accuracy of the relative position of the lens 103 can be increased.

In a second method in accordance with at least one exemplary embodiment, a reference position is sensed by adjusting a mounting location of the position sensor 105.

More specifically, a sliding mechanism (not shown, but corresponding to the sliding mechanism of 110) that slides the position sensor 105 in the moving direction of the lens 103 (in the optical axis L direction) is operatively connected to the lens barrel 109. A position of the position sensor 105 is adjusted to correspond to a point where the error of position detection becomes substantially zero or some predetermined minimum value, while sliding the position sensor 105 with respect to the lens barrel 109, with the sliding mechanism.

After the position of the position sensor 105 is adjusted, the position sensor 105 is secured to the lens barrel 109.

In a third method in accordance with at least one exemplary embodiment, a reference position is sensed by adjusting mounting locations of the reset sensor 100 and the position sensor 105.

More specifically, a sliding mechanism that slides each of the reset sensor 100 and the position sensor 105 in the moving direction of the lens 103 (in the optical axis L direction), is operatively connected (e.g., mounted) to the lens barrel 109. In the process of securing the reset sensor 100 and the position sensor 105 to the lens barrel 109, positions of the reset sensor 100 and/or the position sensor 105 can be adjusted such that the output of the reset sensor 100 changes at a point where the error of position sensing becomes substantially zero or some predetermined minimum value. In essence, the position sensor 105 can be slid until the error of position sensing becomes substantially zero or some predetermined minimum value, then the rest position sensor 100 can be slid until the output of the reset sensor 100 changes a predetermined value, or the movement can occur in opposite order. After the adjustment, the reset sensor 100 and the position sensor 105 are secured to the lens barrel 109. In other additional exemplary embodiments, the reset sensor 100, fixed with respect to the lens barrel 109, is slid to a position where the output of the reset sensor 100 changes a predetermined value. As the reset sensor 100 is moved, along with the lens barrel 109, the position sensor 105 moves, which is also fixed to the lens barrel 109 at this point. Then the position sensor 105 is unfixed with respect to the lens barrel 109 and slid to a position where the error of position sensing becomes substantially zero or some predetermined minimum value, then it is fixed with respect to the lens barrel 109 again. This process can be reversed with the position sensor 105 fixed and moved, then the reset sensor 100 unfixed and moved, then fixed.

As described above, by adjusting a mounting location of at least one of the reset sensor 100 and the position sensor 105 with respect to the lens barrel 109, the sensing accuracy of a reference position can be increased, and therefore, the sensing accuracy of the relative position of the lens 103 can be increased. The adjustment operation may be manual, or may be carried out by an apparatus that moves the reset sensor 100 and/or the position sensor 105 along respective slide mechanisms.

Second Embodiment

In the first embodiment, by mechanically adjusting a mounting location of at least one of a reset sensor and a position sensor with respect to a lens barrel, the sensing accuracy of a reference position can be improved. In a second embodiment of at least one exemplary embodiment, a position sensing device can improve the sensing accuracy of the reference position by arithmetic operations. The position sensing device according to the second embodiment is described next with reference to the accompanying drawings. Here, the same components as those illustrated and described in relation to the first embodiment are designated by the same reference numerals.

Figure 7:
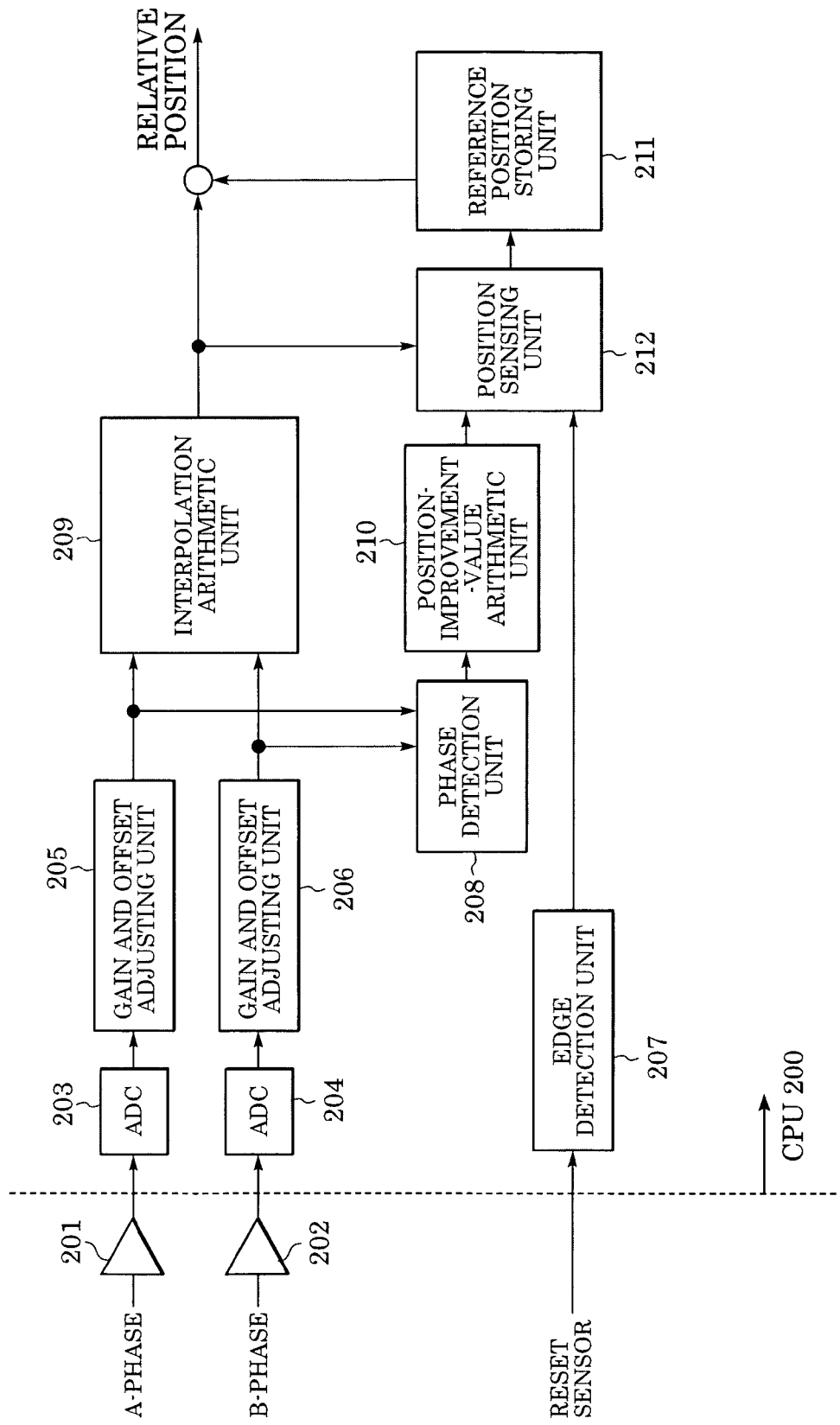
FIG. 7 illustrates a block diagram of a position sensing device according to a second embodiment of at least one exemplary embodiment.

FIG. 7 illustrates a block diagram for sensing a relative position of a lens, which can use the A-phase and B-phase outputs of a position sensor and the output of a reset sensor.

Amplifiers 201 and 202 carry out an amplifying operation and a filtering operation on an A-phase signal and a B-phase signal. Output signals from the amplifiers 201 and 202 can be quantized by an analog-to-digital (AD) conversion operation in AD converters (ADC) 203 and 204. The gain and offset of the digital signals AD-converted by the AD converters 203 and 204 are adjusted by gain and offset adjusting units 205 and 206, respectively.

An interpolation arithmetic unit (first arithmetic unit) 209 cuts out waveforms of the signal gain/offset adjusted by the gain and offset adjusting units 205 and 206. The interpolation arithmetic unit 209 then combines these waveforms to generate position data.

Additionally, the phases of the A-phase and B-phase signals are detected by a phase detection unit 208. A position improvement value arithmetic unit (a second arithmetic unit) 210 computes, based on the detection result from the phase detection unit 208, a position improvement value for a reference position, that is, a difference between the position data generated by the interpolation arithmetic operation and ideal data. The details of the arithmetic operation are described later.

An edge detection unit 207 detects a rising edge or a falling edge of a reset sensor (e.g., a photo interrupter) 100 and outputs a signal indicating whether the edge is detected or not to a position sensing unit 212.

When triggered by the edge detection of the edge detection unit 207, the position sensing unit (improvement unit) 212 improves the position data generated by the interpolation arithmetic unit 209, which can use the arithmetic result (i.e., improvement data for a reference position) from the position improvement value arithmetic unit 210. Consequently, the improved position data is closer to the ideal data.

The position data improved by the position sensing unit 212 is stored in a reference position storing unit 211, (e.g. a RAM, an EEPROM, other equivalents, and any other data storage methods and devices as known by one of ordinary skill in the relevant art). Thus, the relative position of the lens 103 can be determined by using the position data (data representing a reference position) stored in the reference position storing unit 211 and the position data (data representing a moving position of the lens 103) output from the interpolation arithmetic unit 209.

The above-described position improvement value can be determined by the following equation (1) when the cutout phase of the sine wave is in the range of $-\lambda/4 \leq \theta \leq \lambda/4$.

$$E = A\sin\theta - \frac{2\sqrt{2}\,A}{\lambda}\theta \text{ where } \left(-\frac{\lambda}{4} \leq \theta \leq \frac{\lambda}{4}\right) \quad (1)$$

Here, E is the position improvement value of a reference position, A is the amplitude of a sine wave, θ is the phase, and λ is the wavelength of the sine wave. In addition, the right side of the dotted line in FIG. 7 can be processed inside the CPU 200.

Figure 8:
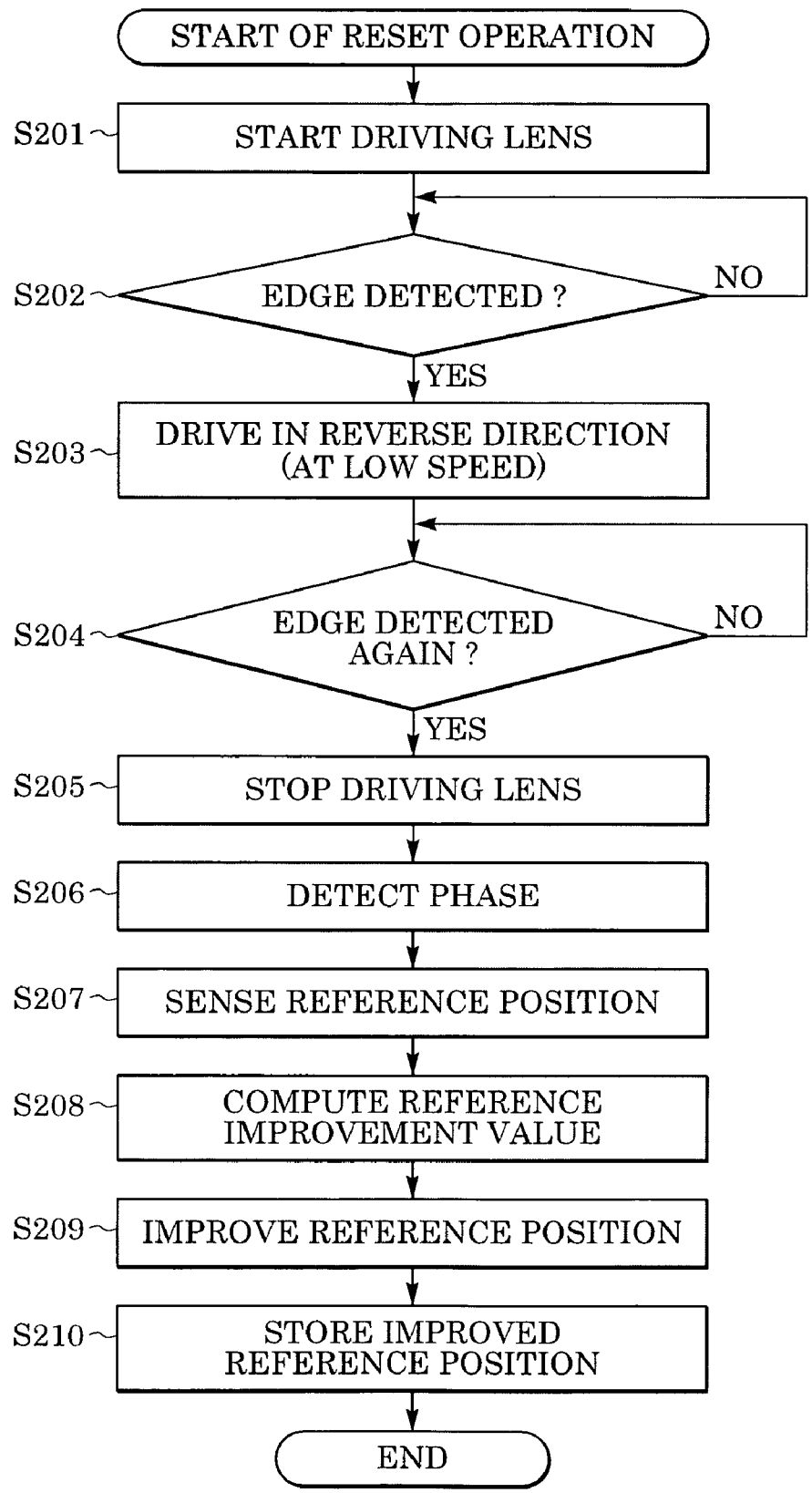
FIG. 8 illustrates a flow chart of a reference position improving operation by the position sensing device according to the second embodiment.
Figure 9:
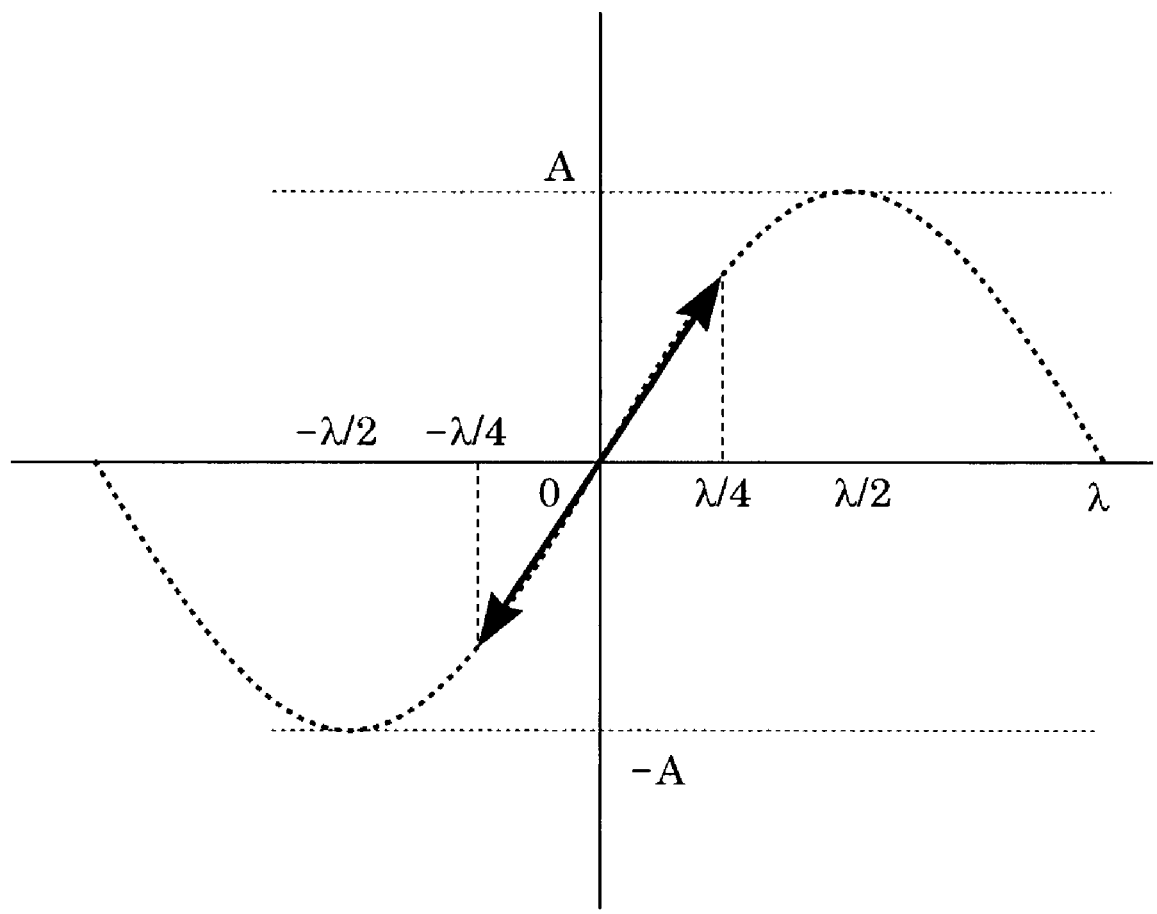
FIG. 9 illustrates the principal of equation (1).

The reset operation in a position sensing device according to this embodiment is described next with reference to a flow chart in FIG. 8. As in the first embodiment, the reset operation starts at power-on time of the lens unit and/or at a time when it is determined that normal position sensing is unavailable due to a position sensing error.

[Step S201]

In the example described, the CPU 200 drives the voice coil motor 221 via the driving circuit 220 to move the lens 103 in the optical axis L direction. Thus, the CPU 200 searches for a reference position, that is, the CPU 200 detects an output edge of the reset sensor 100. For example, by powering on the coil 108 of the voice coil motor 221 (refer to FIG. 1), the CPU 200 moves the lens 103 toward a position corresponding to a mechanical end of the moving area of the lens 103 or lens barrel 109, while the CPU 200 searches for a edge during the movement.

[Step S202]

As in the first embodiment, the CPU 200 determines whether the output of the reset sensor 100 changes. That is, an output edge of the reset sensor 100 is detected as a trigger of sensing a reference position. Here, the detecting operation is repeated until the output edge of the reset sensor 100 is detected. If the output edge is detected, the process proceeds to step S203.

[Step S203]

To increase the sensing accuracy of the reference position, the lens 103 can be driven to move in the reverse direction at a reduced speed. That is, the lens 103 is moved in the direction opposite to the direction in which, at step S202, the lens 103 is moved until the output edge of the reset sensor 100 is detected. In at least one further exemplary embodiment, the speed can be varied.

[Step S204]

As in the step S202, it is determined whether the output of the reset sensor 100 changes or not. Here, the edge detecting operation is repeated until the output edge of the reset sensor 100 is detected. If the output edge is detected, the process proceeds to step S205.

[Step S205]

The CPU 200 stops driving the voice coil motor 221 via the driving circuit 220 so as to stop driving the lens 103.

[Step S206]

The CPU 200 detects a phase of the A-phase or B-phase waveform, which can be used for calculating the above-described improvement value for the reference position. For example, the phase may be detected by sampling the waveform at a sampling rate of a multiple of the wavelength $\lambda$ starting from a phase where the amplitude of the waveform is at its peak (at a maximum (or preset increased value) or minimum point (or a preset decreased value)).

[Step S207]

The position data representing the reference position is then determined from the result of the interpolation arithmetic operation. Here, the position data representing the reference position includes an error (a shift from the ideal data), as illustrated in FIG. 4).

[Step S208]

A position improvement value for the reference position is computed (e.g., by using the above-described equation (1)).

[Step S209]

The position data obtained at step S207 can be improved by using the position improvement value for the reference position obtained at step S208.

[Step S210]

The improved position data for the reference position is stored in the reference position storing unit 211, (e.g. a RAM, an EEPROM, other equivalents, and any other data storage method or device as known by one of ordinary skill in the relevant arts). When sensing a relative position, the improved position data for the reference position stored in the reference position storing unit 211 can be used.

According to this embodiment, as illustrated in FIG. 4, a shift of the position data determined by using the interpolation arithmetic operation from the ideal data can be improved. Accordingly, the accuracy of sensing the reference position can be increased. Since the accuracy of sensing the reference position is increased and the relative position of the lens 103 is determined based on the reference position, the accuracy of sensing the relative position of the lens 103 can be also increased.

The above-described operation is a process to improve the shift of the position data computed (e.g., by using the interpolation arithmetic operation from the ideal data).

Figure 10:
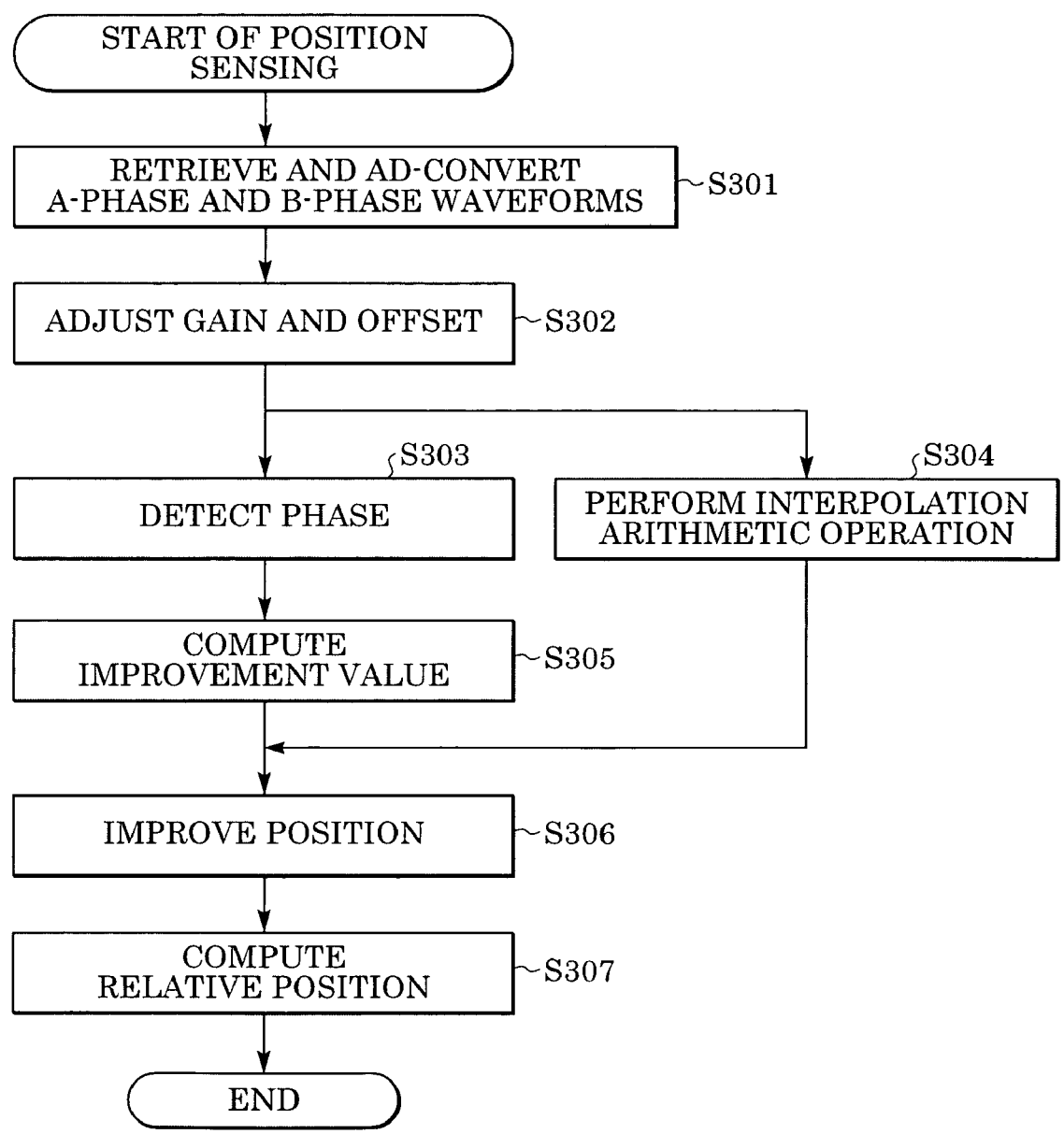
FIG. 10 illustrates a flow chart of the position sensing operation by the position sensing device according to the second embodiment.

The operation to sense a relative position by using position data representing the improved reference position is described next with reference to a flow chart in FIG. 10.

[Step S301]

The CPU 200 retrieves the A-phase and B-phase waveforms amplified by the amplifiers 201 and 202 via the AD converters 203 and 204.

[Step S302]

The gain and offset adjusting units 205 and 206 adjust the gain and offset of signals output from the AD converters 203 and 204 (i.e., the A-phase and B-phase waveforms). This adjustment may be carried out on analog signals before the AD converters 203 and 204 input them.

[Step S303]

The phase detection unit 208 detects phases of the A-phase and B-phase waveforms adjusted at step S302.

[Step S304]

The interpolation arithmetic unit 209 cuts out predetermined parts of the waveforms adjusted at step S302, that is, cuts out components of the waveforms within the range of $\lambda/4$, and then combines the cutout A-phase and B-phase waveforms to generate position data (interpolation arithmetic operation). This position data represents the current position of the lens 103. However, this position data may be shifted from the ideal data. For example in one exemplary embodiment, as the lens 103 is moved, multiple wavelengths of A-phase and B-phase are recorded by the position sensor 105, with reference to a starting time. The spatial distance between marking on the scale 104 (e.g., alternating magnetic poles, or reflective regions spatially separated by a known amount) and the number of wavelengths recorded, provide an approximation of the total position the lens 103 has moved with respect to the starting position. This position can be further improved by using the phase data as described below.

[Step S305]

The position improvement value arithmetic unit 210 computes an improvement value for the position data representing the current position of the lens 103 (e.g. by using the phase detected at step S303 and the above-described equation (1)). Improvement values can have various values, for example, if the position data generated by the interpolation arithmetic operation is identical to the ideal data, the improvement value is zero.

[Step S306]

The position sensing unit 212 improves the position data acquired at step S304 (e.g., by using the improvement value computed at step S305). Consequently, the improved position data is closer to the ideal data.

[Step S307]

The relative position of the lens 103 can be computed by using the position data acquired at step S306 (i.e., the improved position data) and the position data stored in the reference position storing unit 211 (i.e., the data closer to the ideal data). The relative position can be obtained by subtracting the position data representing the current position of the lens 103 from the position data representing the reference position.

As described above, by carrying out improvement processes on the position data representing the reference position and the position data representing the current position of the lens 103, the accuracy of sensing the relative position determined by these position data can be increased. That is, the position data representing the reference position and the position data representing the current position of the lens 103 are closer to the ideal data. Consequently, the relative position of the lens 103 can be sensed more accurately.

In the above-described exemplary embodiments, the position of the lens 103 can be sensed by using two waveforms (e.g., an A-phase and B-phase waveform). However, exemplary embodiments are not limited thereto. For example, more than two waveforms may be used to sense the position.

In the at least one exemplary embodiment, a reset sensor (photo interrupter) is used to sense the reference position. However, other configurations may be employed. For example, the lens 103 can be brought into contact with a mechanical end of the lens barrel 109 or lens 103 and that position can be defined as a reference position. The above-described improvement process (i.e., an improvement process to improve the shift of the position data from the ideal data) may be carried out on data acquired at that time.

Furthermore, in the above-described exemplary embodiments, the position of the focusing lens 103 is sensed. However, a position sensing device according to at least one exemplary embodiment can be applied to a zoom lens that moves in its optical axis direction for variable magnification. Also, in the above-described exemplary embodiments, the position sensing device can be mounted on a lens unit. However, for example, the position sensing device according to at least one further exemplary embodiment can be applied to machine tools in order to determine the position of an object.

The lens units according to the above-described exemplary embodiments may be applied to still cameras, video cameras, camera systems including the lens unit and a camera having the lens unit, and all-in-one cameras with a lens (imaging apparatuses).

While the present invention has been described with reference to exemplary embodiments, it is to be understood that the invention is not limited to the disclosed exemplary embodiments. On the contrary, exemplary embodiments intended to cover various modifications and equivalent arrangements included within the spirit and scope of the appended claims, specification, drawings, and as known by one of ordinary skill in the relevant art. The scope of the following claims is to be accorded the broadest interpretation so as to encompass all such modifications and equivalent structures and functions.

This application claims priority from Japanese Patent Application No. 2004-189814 filed Jun. 28, 2004, which is hereby incorporated herein in its entirety.

What is claimed is:

1. A lens apparatus comprising:
   a lens movable in a direction of an optical axis;
   a lens driving unit configured to move the lens in the direction of the optical axis;
   a first position sensing unit configured to output a plurality of detection signals that periodically change in accordance with movement of the lens;
   a second position sensing unit configured to detect a reference position of the lens; and
   an arithmetic unit configured to compute a relative position of the lens in relation to the reference position,
   wherein the arithmetic unit is configured to compute first position data indicating the reference position based on the plurality of detection signals, to compute a difference included in the first position data based on a phase of the plurality of detection signals, and to compute corrected first position data, in which the difference is corrected, based on the first position data and the difference, when the lens is at the reference position,
   wherein the arithmetic unit is configured to compute second position data indicating an arbitrary position based on the plurality of detection signals, to compute a difference included in the second position data based on a phase of the plurality of detection signals, and to compute corrected second position data, in which the difference is corrected, based on the second position data and the difference, when the lens is at the arbitrary position,
   wherein the arithmetic unit is configured to compute the relative position of the lens in relation to the reference position based on the corrected first and second position data, and
   wherein the difference included in the first position data and the difference included in the second position data are obtained from the following equation:

$$E = A\sin\theta - \frac{2\sqrt{2}\,A}{\lambda}\theta \text{ where}\left(-\frac{\lambda}{4} \le \theta \le \frac{\lambda}{4}\right) \quad (1)$$

where, E is the difference of a reference position, A is the amplitude of the plurality of detection signals, θ is the phase, and λ is the wavelength of the plurality of detection signals.

2. A camera system comprising:
   a camera; and
   a lens apparatus attached to the camera, the lens apparatus comprising:
   a lens movable in a direction of an optical axis;
   a lens driving unit configured to move the lens in the direction of the optical axis;
   a first position sensing unit configured to output a plurality of detection signals that periodically change in accordance with movement of the lens;
   a second position sensing unit configured to detect a reference position of the lens; and
   an arithmetic unit configured to compute a relative position of the lens in relation to the reference position,
   wherein the arithmetic unit is configured to compute first position data indicating the reference position based on the plurality of detection signals, to compute a difference included in the first position based on a phase of the plurality of detection signals, and to compute corrected first position data, in which the difference is corrected, based on the first position data and the difference, when the lens is at the reference position,
   wherein the arithmetic unit is configured to compute second position data indicating an arbitrary position based on the plurality of detection signals, to compute a difference included in the second position data based on a phase of the plurality of detection signals, and to compute corrected second position data, in which difference is corrected, based on the second position data and the difference, when the lens is at the arbitrary position,
   wherein the arithmetic unit is configured to compute the relative position of the lens in relation to the reference position based on the corrected first and second position data, and wherein the difference included in the first position data and the difference included in the second position data are obtained from the following equation:

$$E = A\sin\theta - \frac{2\sqrt{2}\,A}{\lambda}\theta \text{ where} \left(-\frac{\lambda}{4} \le \theta \le \frac{\lambda}{4}\right) \quad (1)$$

where, E is the difference of a reference position, A is the amplitude of the plurality of detection signals, $\theta$ is the phase, and $\lambda$ is the wavelength of the plurality of detection signals.

* * * * *